US008483936B2

(12) United States Patent
Giovaresco

(10) Patent No.: US 8,483,936 B2
(45) Date of Patent: Jul. 9, 2013

(54) METHOD, RECORDING SUPPORT AND DEVICE TO CALIBRATE FUEL INJECTION

(75) Inventor: Florent Giovaresco, Claix (FR)

(73) Assignee: Renault Trucks, St. Priest (FR)

( * ) Notice: Subject to any disclaimer, the term of this patent is extended or adjusted under 35 U.S.C. 154(b) by 892 days.

(21) Appl. No.: 12/600,474

(22) PCT Filed: May 29, 2007

(86) PCT No.: PCT/IB2007/002884
§ 371 (c)(1), (2), (4) Date: Nov. 17, 2009

(87) PCT Pub. No.: WO2008/146078
PCT Pub. Date: Dec. 4, 2008

(65) Prior Publication Data

US 2010/0161201 A1 Jun. 24, 2010

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ........... 701/105; 701/111; 701/114; 123/435; 123/488

(58) Field of Classification Search
USPC .................. 701/105, 106, 111, 114; 123/435, 123/478, 480, 488; 73/114.45, 114.46, 114.47, 73/114.48, 114.49, 114.51
See application file for complete search history.

(56) References Cited

U.S. PATENT DOCUMENTS 4,109,517 A * 8/1978 Dyballa et al. ............ 73/114.49
6,480,781 B1 * 11/2002 Hafner et al. ................ 701/104
7,258,107 B2 * 8/2007 Johnson et al. .............. 123/435
7,310,575 B2 * 12/2007 Honda ......................... 701/111
2003/0041840 A1 * 3/2003 Hiltner ..................... 123/406.42
2004/0158388 A1 8/2004 Fujiwara et al.

FOREIGN PATENT DOCUMENTS

EP 0921296 A 6/1999
JP 2000054907 2/2000
WO 2005031137 A 4/2004
WO 2005042952 A 5/2005

OTHER PUBLICATIONS

Japanese Official Action for corresponding Japanese App. 2010-509902.
International Search Report for corresponding International Application PCT/IB2007/002884.

* cited by examiner

*Primary Examiner* — Willis R Wolfe, Jr.
*Assistant Examiner* — Anthony L Bacon
(74) *Attorney, Agent, or Firm* — WRB-IP LLP

(57) ABSTRACT

A method to calibrate the fuel injection in at least one combustion chamber of a Diesel engine includes:

a) recording the combustion noise power or amplitude in the combustion chamber over a piston position range $[\gamma_{1i};\gamma_{2i}]$,
b) at the same time, recording the piston position during the same piston position range $[\gamma_{1i};\gamma_{2i}]$,
c) determining from the preceding recordings for which piston position $K_{min-i}$ the measured combustion noise power passes through a minimum $P_{min-i}$ when the piston moves from position $\gamma_{1i}$ to position $\gamma_{2i}$,
d) adjusting the fuel injection according to the determined piston position $K_{min-i}$.

8 Claims, 4 Drawing Sheets

METHOD, RECORDING SUPPORT AND DEVICE TO CALIBRATE FUEL INJECTION

BACKGROUND AND SUMMARY

The present invention relates to a method, a recording support and a device to calibrate fuel injection.

The Applicant knows a method to calibrate the fuel injection in at least one combustion chamber of a Diesel engine. Each combustion chamber has a piston that moves along a piston stroke between a top dead center and a bottom dead center.

For example, it is known from DE 196 12 179 to measure the combustion noise using knock sensors and to compare the measured combustion noise to a predetermined threshold SW.

By "combustion noise" we mean the noise produced by the fuel when it is injected in the combustion chamber and the noise produced by the explosion of the injected fuel in the combustion chamber. This combustion noise is not a mechanical noise produced by impacts or chocks on mechanical parts of the Diesel engine. The combustion noise is the vibration of the engine structure caused by the fuel injection and the fuel explosion.

For memory, it is reminded that the time at which the fuel explosion takes place in a combustion chamber of a Diesel engine is not known accurately because such explosion is not triggered by a spark like in other combustion engines.

In DE 196 12 179, the time $T_c$ at which the measured combustion noise exceeds threshold SW is considered as being the time when the fuel explosion begins in the combustion chamber. This information on time $T_c$ allows to adjust the fuel injection in this particular combustion chamber.

However, this method is not very reliable. In fact, time $T_c$ varies from one engine cycle to the other even if every Diesel engine parameters are maintained constants from one cycle to the other. The engine cycle is defined as being the time range or the piston position range over which only one fuel explosion takes place in each of the combustion chambers of the engine.

Time $T_c$ is not a very accurate representation of the actual time at which the fuel explosion begins. Thus, any fuel injection adjustment based on this time $T_c$ is not very reliable.

Accordingly, it is desirable to provide a more reliable method to calibrate the fuel injection in at least one combustion chamber of a Diesel engine.

The invention provides, according to an aspect thereof, a fuel injection calibration method comprising for at least one combustion chamber:

a) recording the combustion noise power or amplitude in the combustion chamber over a piston position range $[\gamma_{1i};\gamma_{2i}]$ where $\gamma_{1i}$, is a piston position where the fuel is injected into the combustion chamber and $\gamma_{2i}$ is a piston position where the explosion of the injected fuel has already begun, b) at the same time, recording the piston position during the same piston position range $[\gamma_{1i};\gamma_{2i}]$, c) determining from the preceding recordings for which piston position $K_{min-i}$ relative to the top dead center of the combustion chamber, the measured combustion noise power passes through a minimum $P_{min-i}$ when the piston moves from position $\gamma_{1i}$ to position $\gamma_{2i}$, d) adjusting (94) the fuel injection according to the determined piston position $K_{min-i}$.

As a result, the piston position $K_{min-i}$, is more accurately correlated with the piston position where the fuel explosion takes place than the position where the combustion noise power exceeds a predetermined threshold. Thus, using piston position $K_{min-i}$ to adjust the fuel injection increases the reliability of the method.

The embodiments of the above method may comprise one or several of the following features:

- the piston position $K_{min-i}$ is determined for each combustion chamber and adjusting the fuel injection comprises adjusting the fuel injection timing in each combustion chamber so that the piston positions $K_{min-l}$ in each combustion chamber are closer to each other,
- the method further comprises:
  - computing an average position $\overline{K}_{min}$ from the positions $K_{min-i}$ determined for each combustion chamber, and
  - adjusting the fuel injection timing in each combustion chamber so that the piston positions $K_{min-i}$ in each combustion chamber are equal to this average position $\overline{K}_{min}$,
- the combustion noise power or amplitude is only recorded for frequencies ranging between 7.5 kHz and 8.5 kHz,
- for at least one combustion chamber:
  - the fuel injection adjustment is performed for different engine speed and engine torque and corresponding fuel injection correction factors are recorded in a memory, and
  - for a given engine speed or an engine torque, the correction factors to be applied to adjust the fuel injection are recovered from said previously recorded correction factors according to the present engine speed and the present engine torque without proceeding to a new determination of the piston position $K_{min-i}$, and
- the piston position range $[\gamma_{1i};\gamma_{2i}]$ is shorter than the piston position range extending from the bottom dead center to the top dead center.

The above embodiments of the method present the following advantages:

- adjusting the fuel injection timing so that positions $K_{min-i}$ are equal or nearly equal in every combustion chamber ensures a smoother rotation of the crankshaft and reduces engine vibrations,
- adjusting the fuel injection timing so that positions $K_{min-i}$ in every combustion chamber are equal to the average position $\overline{K}_{min}$ further reduces the engine vibrations,
- only using noise frequencies ranging between 7.5 kHz and 8.5 kHz increases the reliability of the method because this frequency range is less disrupted by mechanical noises,
- recording the fuel injection correction factors for specific engine speeds and torques simplifies the fuel injection adjustment.

The invention also relates to an information recording support comprising instructions to execute the above method when the instructions are executed by an electronic calculator.

The invention also relates to a device to calibrate the fuel injection in at least one combustion chamber of a Diesel engine, the combustion chamber having a piston that moves along a piston stroke between a top dead center and a bottom dead center, the device comprising:

- at least one knock sensor fixedly registered to the Diesel engine to measure the combustion noise power or amplitude in the combustion chamber,
- at least one piston position sensor able to sense the piston position along the piston stroke,
- an electronic calculator able to:
  - record the measured combustion noise power or amplitude in the combustion chamber over a piston position range $[\gamma_{1i};\gamma_{2i}]$, where $\gamma_{2i}$ is a piston position where the fuel is injected into the combustion chamber and $\gamma_{2i}$ is a piston position where the explosion of the injected fuel has already begun, at the same time, record the piston position over the same piston position range, determine from the preceding recordings for which piston position $K_{min-i}$ relative to the top dead center of this combustion chamber the measured combustion noise power passes through a minimum $P_{min-i}$ when the piston moves from position $\gamma_{1i}$ to position $\gamma_{2i}$, and adjust the fuel injection according to the determined piston position.

These and other aspects of the invention will be apparent from the following description, drawings and claims.

BRIEF DESCRIPTION OF THE DRAWINGS

In these drawings, the same reference numbers are used to designate the same elements.

In the following description, well-known functions or constructions by a person of ordinary skill in the art are not described in details.

DETAILED DESCRIPTION

Figure 1:
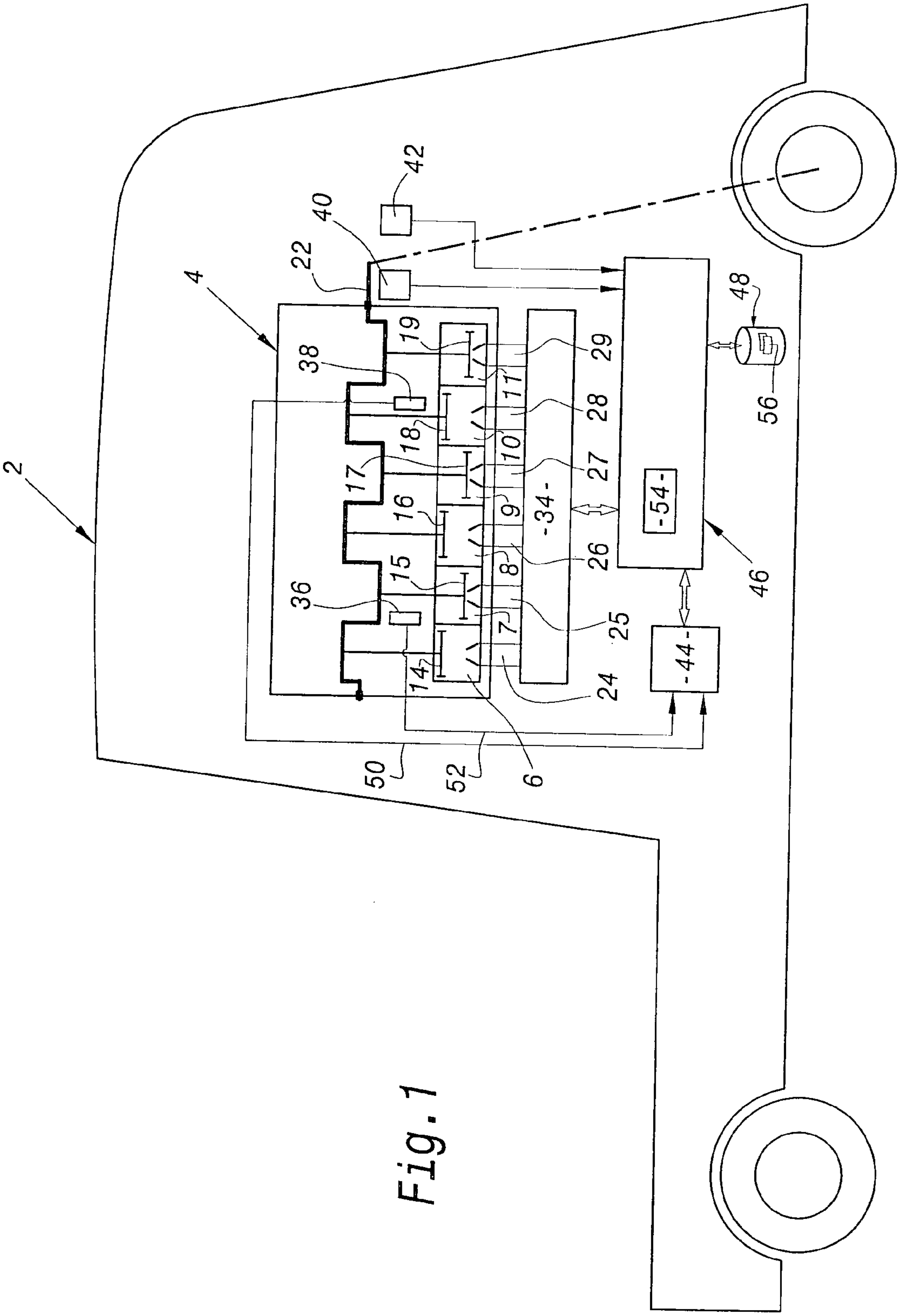
FIG. 1 is a schematic diagram of a truck including a device to calibrate the fuel injection of a Diesel engine.

FIG. 1 shows a truck 2 equipped with a Diesel engine 4. For example, Diesel engine 4 has six cylinders, each cylinder defining a combustion chamber, respectively, 6-11. Each combustion chamber 6-11 has a respective piston 14-19 that runs along a piston stroke. Each piston stroke extends between a top dead center and a bottom dead center. When the piston is in the top dead center position, the volume of the combustion chamber is minimal. In contrast, when the piston is in the bottom dead center position, the volume of the combustion chamber is maximal.

Each piston 14-19 is mechanically linked to a crankshaft 22 that rotates at engine angular speed ω. More precisely, each piston starts to exert a force to rotate crankshaft 22 at an angle $\gamma_{ci}$ where the fuel explosion begins in the corresponding combustion chamber.

In the following specification, index i or letter i refers to the number of a combustion chamber. For example, herein, numbers 1 to 6 are assigned to combustion chambers 6-11, respectively.

In engine 4, the positions $\gamma_{ci}$ in each combustion chamber are spaced apart by 120° so that one engine cycle corresponds to a rotation of 720° of crankshaft 22.

Crankshaft 22 exerts a torque that is transmitted through transmission mechanisms to the traction wheels of truck 2. The transmission mechanisms have not been represented in FIG. 1 for simplicity.

At least one fuel injector is registered with each combustion chamber of engine 4. In FIG. 1, for simplicity, only fuel injectors 24-29 registered to respective combustion chambers 6-11, are shown. Each fuel injector propels the fuel inside the combustion chamber.

Each fuel injector is fluidly connected to a fuel injection unit 34 from which each fuel injector draws fuel.

Truck 2 is also equipped with a device to calibrate the fuel injection start time in each combustion chamber. This device comprises:

two knock sensors 36 and 38 fixedly mechanically registered to engine 4, one angular speed and position sensor 40 that measures both the angular position and the angular speed ω of crankshaft 22, a torque estimator 42 that estimates torque Ω exerted by crankshaft 22 from a model of engine 4 and from other measured information, a knock processing chip 44 that processes the signal outputted by sensors 36 and 38 and that outputs the combustion noise power of one combustion chamber according to time, an electronic calculator 46 connected to chip 44 and to sensor 40 and estimator 42 to adjust the fuel injection start time and to command each fuel injectors 24-29, and a memory 48 connected to calculator 46.

Sensors 36 and 38 are mechanically fixed to engine 4 without any degree of freedom. More precisely, sensor 36 is fixed to engine 4 as close as possible of combustion chambers 6-8 Reversely, sensor 38 is fixed to engine 4 as close as possible of combustion chambers 9-11. For example, knock sensors 36 and 38 are accelerometers sensors and usually have transducers built from piezoelectric materials.

The acceleration measured by sensors 36 and 38 are transmitted to chip 44 through connection lines 50 and 52.

Chip 44 is able to process the signals outputted by sensors 36 and 38 to output to calculator 46 the presently measured combustion noise power. The signal processing performed by chip 44 will be described in more details in view of FIG. 6.

Figure 6:
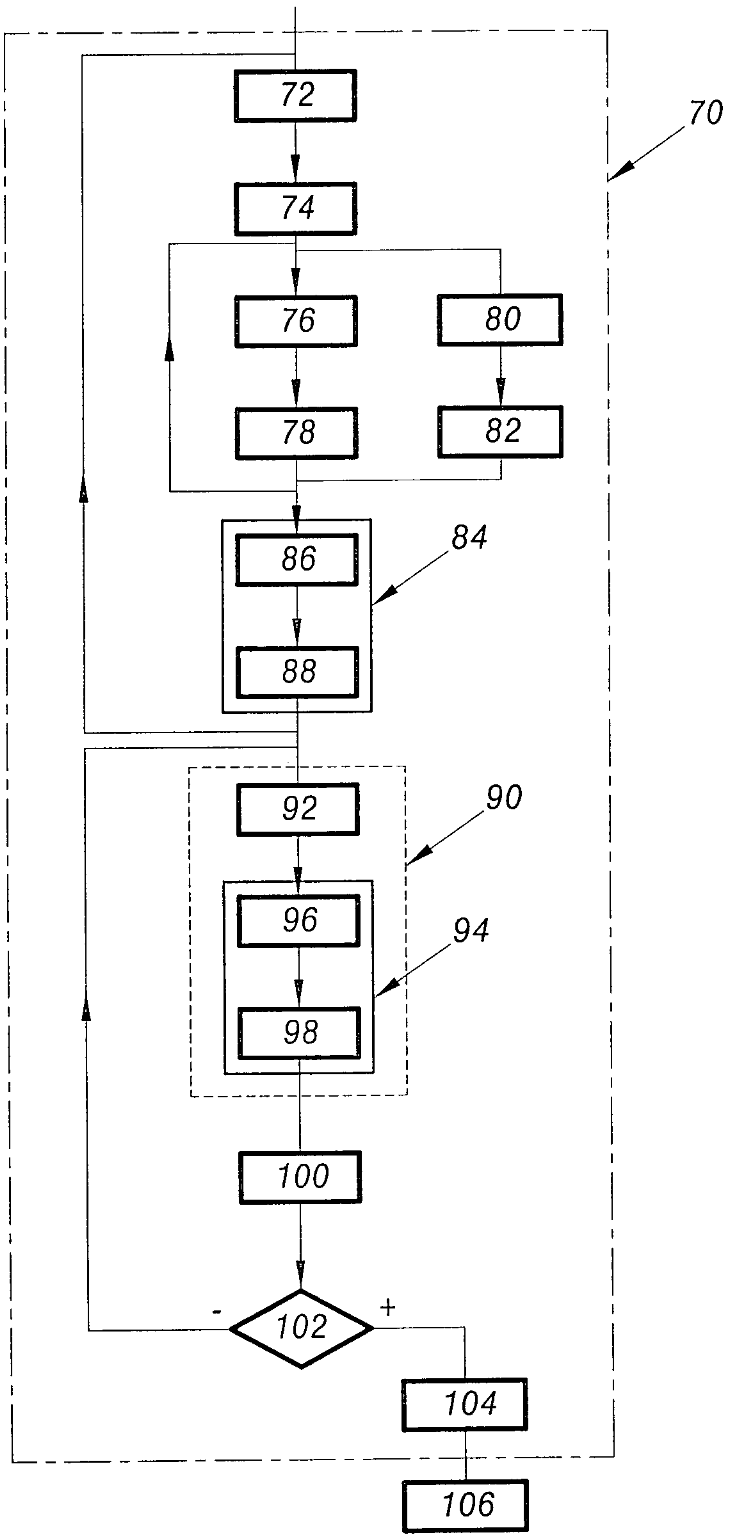
FIG. 6 is a flowchart of a method to calibrate the fuel injection of the truck of FIG. 1.

For example, calculator 46 is a programmable electronic calculator able to execute program instructions to perform the method of FIG. 6. To this end, calculator 46 is connected to memory 48 and memory 48 stores the program instructions necessary to execute the method of FIG. 6.

For example, calculator 46 is known as an EMS ECU (Engine Management System Electronic Control Unit).

Calculator 46 includes an injection scheduler 54 that determines the injection start time in each combustion chamber according to a predetermined angular piston position $\alpha_i$ and according to the measured angular speed ω. Angular position $\alpha_i$ represents the position of the piston in combustion chamber i at which the fuel injection must start. Position $\alpha_i$ is expressed in degrees and is relative to the top dead center position of this piston in combustion chamber i.

It is pointed out that in an engine, a piston angular position can be easily converted into a time. This results from the fact that it is always possible to find the time corresponding to an angular position using the angular speed ω and vice versa. In this description, piston angular positions are mainly used but time and time range could have been used instead of angular position and angular range.

Memory 48 stores also one correction angle map 56 per combustion chamber. Each map 56 records the value of a correction factor for different engine speeds ω and engine torques Ω Therein, the correction factor is a correction angle $\beta_i$. Correction angle $\beta_i$ is an angle intended to be added to a nominal pre-set angle $\alpha_{i0}$ at which fuel injection should start in combustion chamber i in order to obtain angle $\alpha_i$, used by scheduler 54. Angles $\alpha_{i0}$ are nominal angle values that are determined independently of the signal measured by sensors 36 and 38. For example, angles $\alpha_{i0}$ are recorded in memory 48 at the time of manufacturing truck 2. Typically, angles $\alpha_{i0}$ are spaced apart from each other by angular range equal to 120° in this embodiment.

Figures 2, 3, 4, 5:
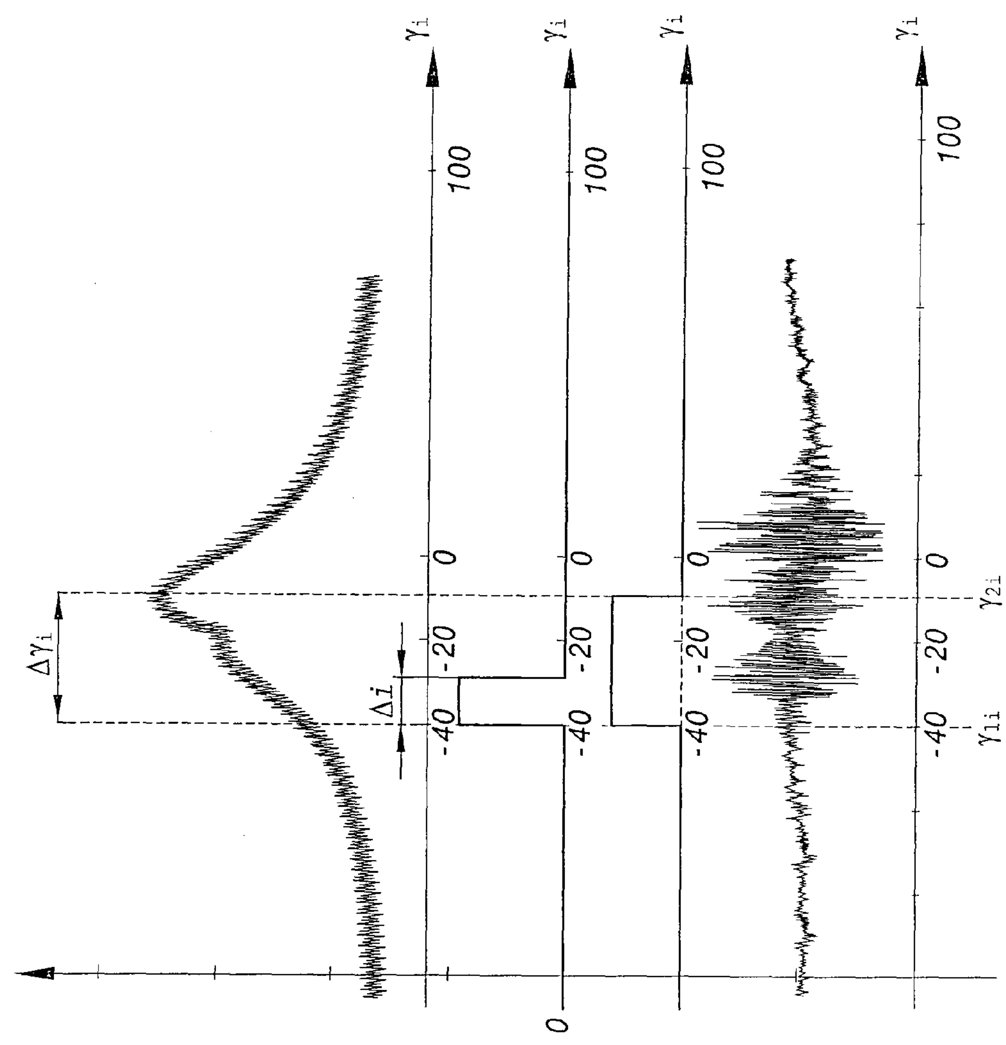
FIG. 2 is a timing chart of the pressure within a combustion chamber of the engine of the truck of FIG. 1.
FIG. 3 is a timing chart of an injector drive pulse used in the engine of the truck of FIG. 1.
FIG. 4 is a timing chart showing a combustion noise measurement window.
FIG. 5 is a timing chart showing the signal outputted by a knock sensor of the truck of FIG. 1.

FIG. 2 shows the evolution of the pressure within combustion chamber i according to the piston position $\gamma_i$. Piston position $\gamma_i$ is expressed in degrees and is relative to the top dead center in combustion chamber i.

As it can be shown from this figure, the pressure grows to a maximum pressure and then decreases. During the growing phase, the fuel explosion takes place.

FIG. 3 shows the injector drive pulse of the same combustion chamber i according to position $\gamma_i$. The rising front of the drive pulse corresponds to an angle $\gamma_{1i}$. At position $\gamma_{1i}$, fuel starts to be injected in combustion chamber i. The pulse lasts during a time interval $\Delta_i$ that corresponds to a specific angular range. During interval $\Delta_i$, unit 34 continuously injects fuel in combustion chamber i. For example, time range $\Delta_i$ is determined according to an engine torque set point or an engine speed set point. In this embodiment, time range $\Delta_i$ is determined independently from the combustion noise.

FIG. 4 shows a piston position range $\Delta_{yi}$ that starts from position $\gamma_{1i}$ and that ends for a piston position $\gamma_{2i}$. During range $\Delta_{yi}$ either one of sensors 36 and 38 is used to continuously measure the combustion noise in combustion chamber i. Range $\Delta_{yi}$ is chosen long enough so that the knock measurement windows lasts from the beginning of the fuel injection to the beginning of the explosion of the fuel injected in the combustion chamber. However, range $\Delta_{yi}$ is much shorter than the piston stroke. For example, range $\Delta_{yi}$ is smaller than 60° and preferably smaller than 40°. In fact, range $\Delta_{yi}$ should be chosen as small as possible because it reduces the calculation load and improves the accuracy of position $K_{min-i}$.

The function of range $\Delta_{yi}$ will be understood in view of the description of FIG. 6.

FIG. 5 shows the combustion noise measured by one of sensor 36 or 38 according to position $\gamma_i$. As shown, it is very difficult to determine from such a raw signal the piston position at which begins the fuel explosion without further signal processing.

The operation of the calibration device will now be described with reference to FIG. 6.

The calibration method starts by a calibration phase 70 during which correction angles $\beta_i$ are determined for each combustion chamber i so as to obtain a more uniform and smoother crankshaft rotation.

At the beginning of phase 70, in step 72, once the engine is running at a constant speed ω and at a constant torque Ω, calculator 46 identifies the combustion chamber in which the next fuel injection will take place. Herein, we consider that speed ω and torque Ω are constant if they do not vary by more than 10%. For example, in step 72, the identification of such a combustion chamber is carried out from the angular position of crankshaft 22 measured by sensor 40 and from the knowledge of the nominal angles $\alpha_{i0}$.

Subsequently, in step 74, calculator 46 selects the knock sensor which is the closest from the identified combustion chamber and adjusts the gain of this knock sensor according to the distance that separates the selected knock sensor from the identified combustion chamber. Thereafter, we assume that knock sensor 36 is selected.

Upon starting of the fuel injection in the identified combustion chamber, i.e. at position $\gamma_{1i}$, in step 76, the selected sensor measures the combustion noise and, in step 78, chip 44 and calculator 46 are used to record the power of the measured combustion noise in the frequency range $[f_{min};f_{max}]$. In this embodiment, frequencies $f_{min}$ and $f_{max}$ are equal to 7.5 kHz and 8.5 kHz, respectively. This frequency range $[f_{min};f_{max}]$ corresponds to a frequency range where the power of the combustion noise is predominant in comparison to other noises like mechanical noises.

More precisely, the power of the combustion noise in the frequency range $[f_{min};f_{max}]$ is obtained as follows.

The signal outputted by the knock sensor is first filtered by an anti-aliasing filter. Then, the signal is converted to a digital signal by an analog-to-digital converter. Subsequently, the digital signal is amplified according to the gain determined as a function of the distance between the knock sensor and the selected combustion chamber. The signal is then transmitted through a bandpass filter which rejects most of the frequencies which are out of frequency range $[f_{min};f_{max}]$. Subsequently, the bandpass filtered signal is sent through a rectifier that outputs the absolute value of the bandpass filtered signal. This absolute value is sent to an integrator that integrates the signal over a predetermined integrator period in order to output the power of the combustion noise in the frequency range $[f_{min};f_{max}]$ to calculator 46. For example, this predetermined integrator period is chosen at least twenty times smaller than the time period corresponding to piston position range $[\gamma_{1i};\gamma_{2i}]$. This predetermined integrator period corresponds to the frequency at which chip 46 delivers to calculator 46 new measured combustion noise power values.

In parallel to steps 76 and 78, in step 80, at the same time, sensor 40 measures the angular position of crankshaft 22 and, in step 82, calculator 46 records the position $\gamma_i$ of the piston in the identified combustion chamber relative to its top dead center. The position $\gamma_i$ of the piston is deduced from the measured angular position of crankshaft 22.

Steps 76 to 82 are repeated as long as position $\gamma_{2i}$ is not reached.

Figure 7:
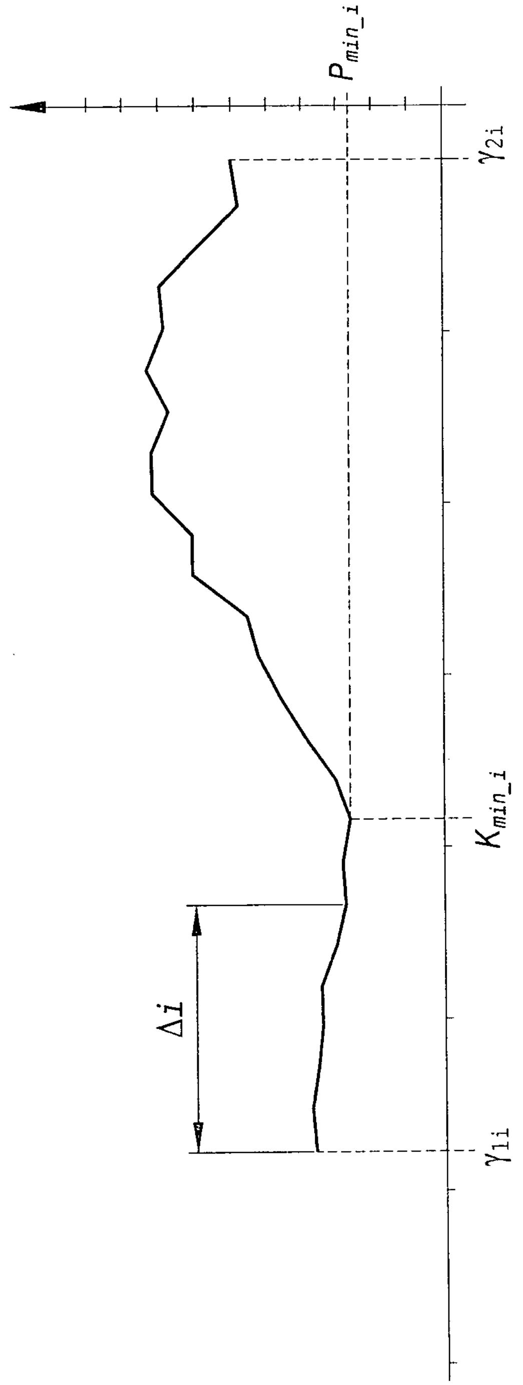
FIG. 7 is a timing chart of a measured combustion noise power according to the piston position in a combustion chamber of the truck of FIG. 1.

FIG. 7 shows an example of the evolution of the combustion noise power recorded in range $\Delta_{yi}$, for cylinder i according to position $\gamma_i$. Typically, at the beginning of range $\Delta_{yi}$, the combustion noise power is high. In this period of time, the noise is produced by the fuel injection. Then, the combustion noise power passes through a minimum $P_{min-i}$, at a position $K_{min-i}$. Then, the combustion noise power sharply increases to reach a maximum. The sharp increase of the combustion noise power is due to the fuel explosion.

Subsequently, in step 84, calculator 46 determines position $K_{min-i}$, from the recorded data over range $\Delta_{yi}$. For example, in an operation 86, calculator 46 identifies a rapid increase in the curve shown in FIG. 7. Then, in an operation 88, calculator 46 finds the best parabolic curve that fits the curve of FIG. 7 just before the rapid increases. Then, this best parabolic curve is derivated according to position $\gamma_i$ to find an accurate value for $K_{min-i}$. Operation 88 reduces the dependency on integrator period and increases the robustness.

Steps 72 to 84 are reiterated for each combustion chamber i of engine 4.

Subsequently, in a step 90, calculator 46 proceeds to the balancing of the positions when each piston applies a force to crankshaft 22 so as to obtain a smoother and more regular rotation of crankshaft 22.

For example, at the beginning of step 90, in an operation 92, calculator 46 computes an average position $\overline{K}_{min-i}$ of the positions $K_{min-i}$. For example, average position $\overline{K}_{min}$ is calculated according to the following relationship:

$$\overline{K}_{min} = \frac{1}{N}\sum_{i=1}^{N} K_{min-i} \tag{1}$$

where N is equal to the number of combustion chambers.

Subsequently, in operation 94, calculator 46 adjusts the individual injection starting times so that each position $K_{min-i}$ becomes equal to $\overline{K}_{min}$. To this end, for example, in sub-operation 96, calculator 46 calculates the individual correction angle $\beta_i$ for each combustion chamber i according to the difference between $K_{min-i}$ and $\overline{K}_{min}$. For example, each correction angle $\beta_i$ is calculated according to the following relationship:

$$\beta_i=\overline{K}_{min}-K_{min-i} \quad (2)$$

Thereafter, in a sub-operation 98, calculator 46 applies the correction angle $\beta_i$ to each nominal pre-set angle $\alpha_{i0}$. More precisely, the fuel injection starting position $\alpha_i$ is computed with the following relationship:

$$\alpha_i=\alpha_{i0}+\beta_i \quad (3)$$

At the end of sub-operation 98, injection scheduler 57 controls fuel injection unit 34 so that the fuel injection in combustion chamber i starts at piston position $\alpha_i$.

Then, in step 100, steps 72 to 84 are reiterated once to obtain new values for each position $K_{min-i}$.

Subsequently, in step 102, new values for each position $k_{min-i}$ are compared to average position $\overline{K}_{min}$. More precisely, in step 102, the following condition is assessed for each combustion chamber i:

$$|K_{min-i}-\overline{K}_{min}|\leq\epsilon \quad (4)$$

where $\epsilon$ is a pre-set constant.

For example, $\epsilon$ is smaller than 0.2° or even smaller than 0.1°.

If the above condition (4) is false for at least one combustion chamber, the method returns to step 90 to adjust once again the fuel injection starting time for each combustion chamber. On the contrary, if condition (4) is true, in step 104 the calibration phase ends and each correction angle $\beta_i$ is recorded in the corresponding map 56 associated with the present engine speed ω and the present engine torque Ω estimation. Thus, from time to time, maps 56 are built and stored. As a result, each map 56 stores the value of respective correction angles $\beta_i$ for different engine speeds and engine torques.

Later on, in step 106, if calculator 46 needs to proceed to a new adjustment of angle $\alpha_i$ because the engine speed or the engine torque has changed, then, if possible, the correction angles $\beta_i$ corresponding to this new engine speed or new engine torque are recovered from maps 56 and then used to determine the appropriate positions $\alpha_i$ at which should start the fuel injection. Then, steps 100 to 102 are reiterated to verify that the recorded correction angles $\beta_i$ are still correct and, otherwise, to return to step 90 to determine new correction angles $\beta_i$. Thus, the above method, continuously or, at least from time to time, monitors and updates the correction angles $\beta_i$ when engine 4 is running.

Many other embodiments are possible. For example, the Diesel engine may have from four to twelve cylinders or even more.

Only one knock sensor may be used. In another embodiment, more than two knock sensors can be used. For example, one knock sensor per combustion chamber can be used.

The fuel injection unit can be whatever existing fuel injection unit. For example, fuel injection unit can be a common rail-injector or a unit pump injection.

Positions $\alpha_i$, may be adjusted so that the positions $K_{min-i}$ are all equal to another predetermined value than average position $\overline{K}_{min}$. For example, this predetermined value can be the median value of the different positions $K_{min-i}$.

The position at which should start the fuel injection can also be defined relative to the bottom dead center. This does not change anything to the preceding explanation because the angular range between the top dead center and the bottom dead center is constant. Thus, when a position is defined relative to the bottom dead center, it is also defined relative to the top dead center.

Chip 44 may output the average amplitude of the combustion noise rather than the power. However, it should be noticed that the average amplitude is directly correlated with the frequency power of the noise.

In another embodiment, during the time interval $\Delta_i$, the fuel injection does not take place continuously but rather by burst or pulse.

Piston position $\gamma_{1i}$ does not have to correspond exactly to the position where the fuel starts to be injected in the combustion chamber. For example, position $\gamma_{1i}$ may be offset by a few degrees to correspond to a piston position where fuel injection is already running.

The frequency range $[f_{min},f_{max}]$ should be selected according to the engine structure to correspond to a frequency range where the combustion noise power is higher than the other noise. Preferably, frequency $f_{min}$ is always chosen higher than 1 kHz and frequency $f_{max}$ is always chosen inferior to 20 kHz. The frequency range $[f_{min}; f_{max}]$ width varies from 0.5 kHz to 10 kHz.

In another embodiment, other relations than relation (2) can be used. For example, relation (2) can be replaced by the following relation:

$$\beta_1=a(\overline{K}_{min}-K_{min-1})+b_{\beta ic} \quad (5)$$

where:

- $\beta_{ic}$ is the former value of the correction angle $\beta_i$ recorded in map 56, for example, and
- coefficients a and b are constants chosen to avoid fast transition from the former value $\beta_{ic}$ of the correction angle to the new value of the correction angle, where a+b=1.

Positions $K_{min-i}$ can also be used to adjust other parameters of the fuel injection than starting angular position $\alpha_i$. For example, positions $K_{min-i}$, can be used to adjust:

- the quantity of fuel injected in the combustion chamber per cycle,
- the fuel injection ending position or time, or
- the value of range $\Delta_i$.

LIST OF REFERENCES

| | |
|---|---|
| 2 | truck |
| 4 | engine |
| 6-11 | combustion chamber |
| 14-19 | pistons |
| 22 | crankshaft |
| 24-29 | injectors |
| 34 | injection control unit |
| 36, 38 | knock sensor |
| 40 | speed and angular position sensor |
| 42 | torque estimator |
| 44 | signal processing chip |
| 46 | calculator |
| 48 | memory |
| 50, 52 | communication lines |
| 54 | fuel injection scheduler |
| 56 | correction angle maps |

The invention claimed is:

1. A method to calibrate the fuel injection in at least one combustion chamber of a Diesel engine, the combustion chamber having a piston that moves along a piston stroke between a top dead center and a bottom dead center, the method comprising for at least one combustion chamber:

a) recording the combustion noise power or amplitude in the combustion chamber over a piston position range $[\gamma_{1i}; \gamma_{2i}]$, where $\gamma_{1i}$ is a piston position where the fuel is injected into the combustion chamber and $\gamma_{2i}$ is a piston position where the explosion of the injected fuel has already begun, b) at the same time, recording the piston position during the same piston position range $[\gamma_{1i}; \gamma_{2i}]$, c) determining from the preceding recordings for which piston position $K_{min-i}$ relative to the top dead center of the combustion chamber, the measured combustion noise power passes through a minimum $P_{min-i}$ when the piston moves from position $\gamma_{1i}$ to position $\gamma_{2i}$, d) adjusting the fuel injection according to the determined piston position $K_{min-i}$.

2. The method according to claim 1, wherein the piston position $K_{min-i}$ is determined for each combustion chamber and wherein adjusting the fuel injection comprises adjusting the fuel injection timing in each combustion chamber so that piston positions $K_{min-i}$ in each combustion chamber are closer to each other.

3. The method according to claim 2, wherein the method further comprises:

computing an average position $\overline{K}_{min}$ from the positions $K_{min-i}$ determined for each combustion chamber, and adjusting the fuel injection timing in each combustion chamber so that the piston positions $K_{min-i}$ in each combustion chamber are equal to this average position $\overline{K}_{min}$.

4. The method according to claim 1, wherein the combustion noise power or amplitude is only recorded for frequencies ranging between 7,5 kHz and 8,5 kHz.

5. The method according to claim 1, wherein for at least one combustion chamber:

the fuel injection adjustment is performed for different engine speed and engine torque and corresponding fuel injection correction factors are recorded in a memory, and for a given engine speed or an engine torque, the correction factors to be applied to adjust the fuel injection are recovered from said previously recorded correction factors according to the present engine speed and the present engine torque without proceeding to a new determination of the piston position $K_{min-i}$.

6. The method according to claim 1, wherein the piston position range $[\gamma_{1i}; \gamma_{2i}]$, is shorter than the piston position range extending from the bottom dead center to the top dead center.

7. Information recording support comprising instructions to execute a method according to claim 1, when the instructions are executed by an electronic calculator.

8. A device to calibrate the fuel injection in at least one combustion chamber of a Diesel engine, the combustion chamber having a piston that moves along a piston stroke between a top dead center and a bottom dead center, the device comprising:

at least one knock sensor fixedly registered to the Diesel engine to measure the combustion noise power or amplitude in the combustion chamber, at least one piston position sensor able to sense a piston position along the piston stroke, an electronic calculator able to:

record the measured combustion noise power or amplitude in the combustion chamber over a piston position range $[\gamma_{1i}; \gamma_{2i}]$, where $\gamma_{1i}$ is a piston position where the fuel is injected into the combustion chamber and $\gamma_{2i}$ is a piston position where the explosion of the injected fuel has already begun, at the same time, record the piston position over the same piston position range, determine from the preceding recordings for which piston position $K_{min-i}$ relative to the top dead center of this combustion chamber the measured combustion noise power passes through a minimum $P_{min-i}$ when the piston moves from position $\gamma_{1i}$ to position $\gamma_{2i}$, and adjust the fuel injection according to the determined piston position $K_{min-i}$.

* * * * *